Figure 4:
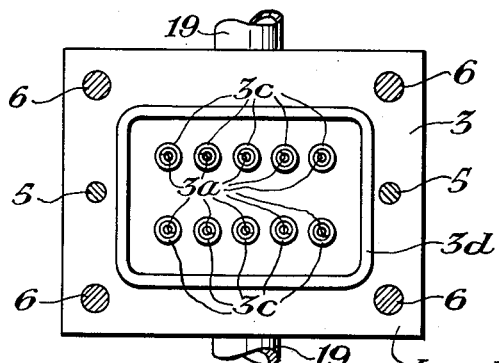

Oct. 25, 1955     H. L. TAYLOR     2,721,839
PLATING APPARATUS FOR ELECTRICAL RECTIFIERS
Filed Oct. 17, 1951     3 Sheets-Sheet 1
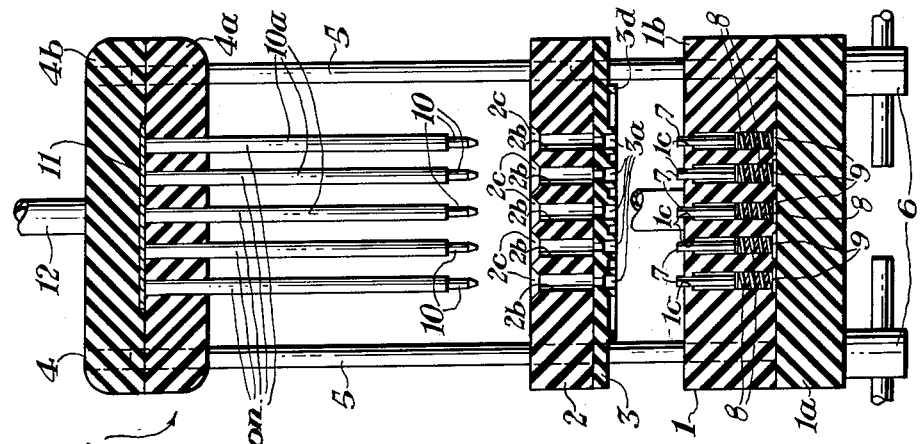
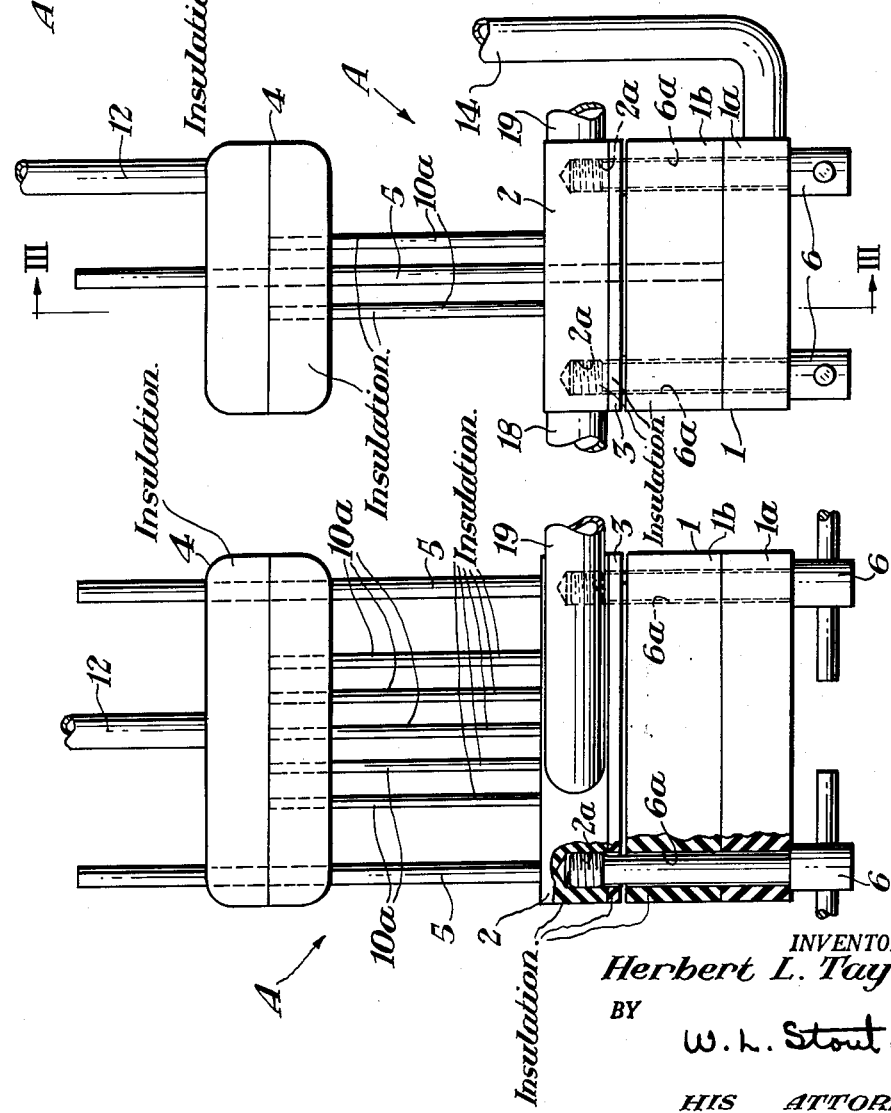
INVENTOR.
Herbert L. Taylor.
BY
W. L. Stout.
HIS ATTORNEY Oct. 25, 1955  H. L. TAYLOR  2,721,839
PLATING APPARATUS FOR ELECTRICAL RECTIFIERS
Filed Oct. 17, 1951  3 Sheets-Sheet 2

INVENTOR.
Herbert L. Taylor.
BY
W. L. Stout
HIS ATTORNEY

INVENTOR.
Herbert L. Taylor.
BY
W. L. Stout.
HIS ATTORNEY

United States Patent Office 2,721,839
Patented Oct. 25, 1955

2,721,839

PLATING APPARATUS FOR ELECTRICAL RECTIFIERS

Herbert L. Taylor, Turtle Creek, Pa., assignor to Westinghouse Air Brake Company, Wilmerding, Pa., a corporation of Pennsylvania Application October 17, 1951, Serial No. 251,756

12 Claims. (Cl. 204—275)

My invention relates to the manufacture of copper oxide rectifiers, and particularly to apparatus for providing an electroplated contact with the cuprous oxide surface of small copper oxide rectifier discs.

In one well-known method for providing an electroplated contact with the cuprous oxide surface of a copper oxide rectifier, the copper discs after oxidation and removal of the cupric oxide coating are electrolytically treated to reduce the outer surface of the cuprous oxide coating to metallic copper preparatory to plating another metal such as nickel on the reduced metallic copper surface. This method of electrolytically reducing the outer surface of the cuprous oxide coating to metallic copper and plating another metal thereon is illustrated and described in Letters Patent of the United States No. 2,328,626, issued on September 7, 1943, to Philip H. Dowling.

In the process of plating a contact, as for example a nickel contact, on the outer surface of the cuprous oxide coating, the edges of the rectifier discs where the oxide coating joins its mother copper should be prevented from being exposed to the electrolyte since a conducting path may be formed by the reduced copper, or the nickel, or the electrolyte such as nickel solution which does not always rinse off cleanly.

In order that the cuprous oxide coating on the edges of the oxidized discs or plates where it joins the mother copper be prevented from becoming reduced to metallic copper, masking methods have been devised in which the edges of the discs or plates are covered by a mask to seal the outer edges against the action of the electrolyte used in the reduction process. The masking methods previously used are to a large extent limited to resilient sealing washers which were clamped to the edges of the rectifier discs or plates. Such masking methods are suitable in effectively sealing the edges of the average size rectifier plate against any electrolytic action, the average size plate being greater than one inch in diameter. Such rectifier plates are readily handled in the various steps of manufacture. Difficulties however arise in the individual handling of small rectifier discs which are smaller in diameter, as for example, rectifier discs of approximately 0.08 inch in diameter. The individual maskings of the smaller sized rectifier discs by the prevalent methods of using masking washers are tedious and costly and require special handling in placing the masked discs in the electrolytic baths for the reduction and plating processes.

It is an object of my invention to provide a fixture for masking a plurality of small oxidized discs and for holding the discs while immersed in electrolytic baths.

A further object of my invention is to provide a fixture whereby the concentrations of an electrolytic bath solution are maintained at a constant value at the surface of the rectifier cell.

In carrying out my invention, I provide a three-part fixture for masking and holding a plurality of copper oxide rectifier discs, the three parts being adjustable with respect to each other through the use of guide rods, two of the parts being adapted to be clamped together by means of thumb screws. The three parts of the fixture which I will hereinafter refer to as a base plate, a mask support and an electrode carrier, are made from a non-conducting material such as Lucite or Bakelite. The mask support is provided with a masking member or mask made of a resilient material such as rubber, the mask being provided with a plurality of recessed openings into each of which an individual oxidized copper disc is inserted and seated upon the annular shoulder formed therein. The mask support is provided with suitable openings which register with the recessed openings of the masking member. The base plate is provided with a plurality of spring biased pins, each pin being adapted to abut a rectifier disc within its recessed opening in the mask when the fixture is assembled in the manner to be described. The spring biased pins also serve as an electrical connector for the rectifier discs during the reducing and plating processes.

The electrode carrier is provided with a plurality of insoluble electrodes, an electrode being provided for each of the openings in the masking section. In one form of the invention the electrode carrier is provided with a compartment in which the individual ballast resistors connected to the individual electrodes are secured.

With the rectifier discs in each of the recessed openings in the masking member, the base plate and mask support are brought together on the guide rods and the two parts are then fastened securely together by means of the thumb screws with the mask therebetween. The mask provides a fluid-tight seal between the base plate and the mask support while the spring biased pins of the base plate urge the discs into fluid-tight engagement with the annular shoulders of the recesses so that only one surface of the rectifier disc is exposed to electrolytic action. The electrode carrier is then moved along the guide rods until the tips of the electrodes are within the openings of the masking section. Suitable electrical connections are then made to the electrodes and the spring biased pins and the fixture is set in an electrolytic bath.

In carrying out the process described in the aforementioned patent, the oxidized copper discs held in my novel fixture are first subjected to a reducing process in which the exposed surface of the cuprous oxide coating of the discs is reduced to metallic copper and then to a plating process in which a metal contact, preferably of nickel, is plated on the reduced metallic copper surfaces of the discs.

It has been found that bubbles formed during the electroplating process retarded the electrolytic action. To overcome this difficulty, I provide a series of transverse openings for each of the recessed openings in the mask support, the transverse openings being located in front of the electrode surface which is to be plated. These transverse openings are connected to a suction pump which in operation removes the air bubbles appearing on the surface of the rectifier disc and within the recessed openings.

Other objects and characteristic features of my invention will appear as the description proceeds.

I shall describe two forms of apparatus embodying my invention, and shall then point out the novel features thereof in claims.

Figure 5:
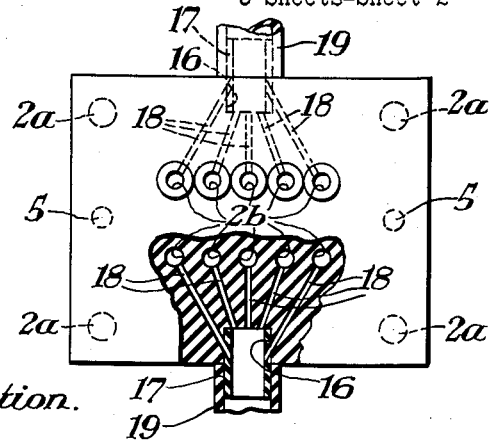
Figure 6:
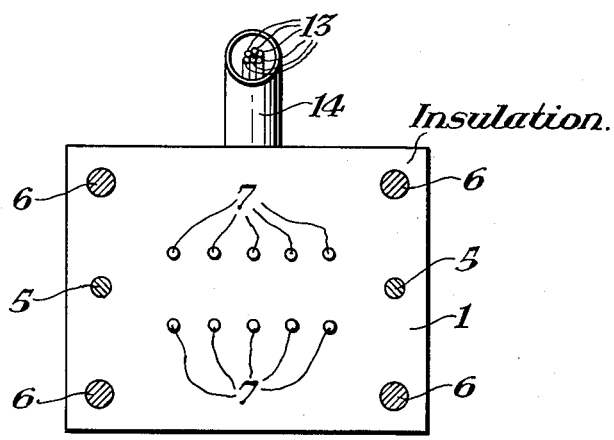
Figure 8:
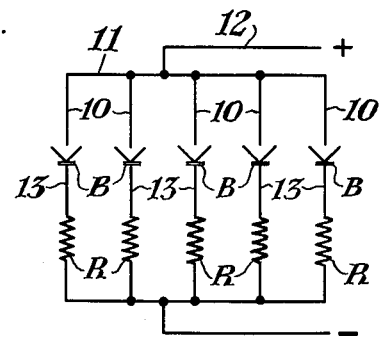
Figure 9:
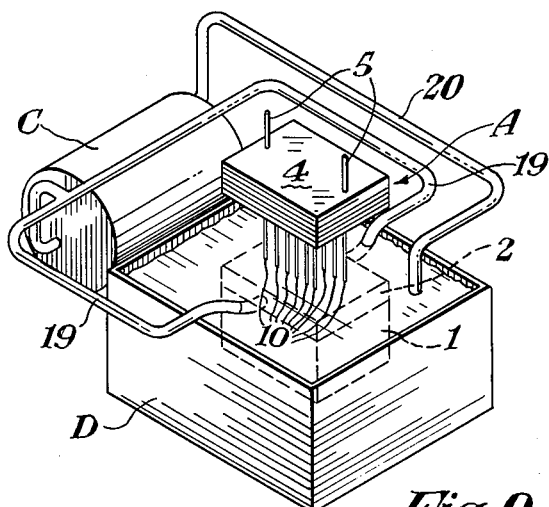
Figure 7:
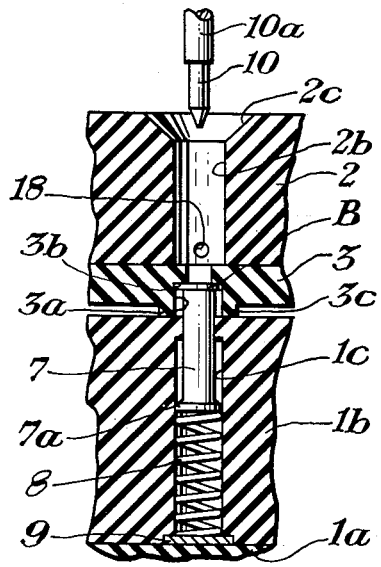
Figure 10:
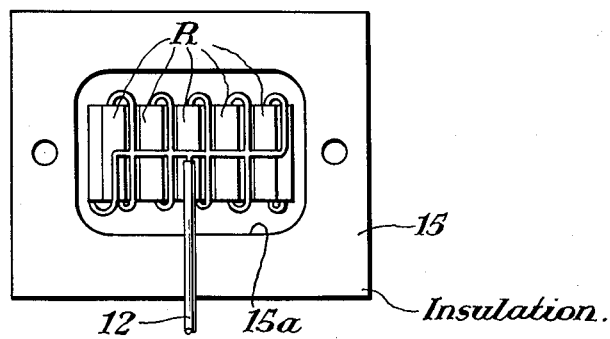

In the accompanying drawings, Fig. 1 is a front elevational view of apparatus embodying my invention. Fig. 2 is a side elevational view of the apparatus illustrated in Fig. 1. Fig. 3 is a sectional view taken along the line III—III of Fig. 2, the parts of the apparatus being separated on the guide rods for illustrating the apparatus to better advantage. Fig. 4 is a bottom plan view of the mask support showing details of the masking member. Fig. 5 is a top plan view of the mask support with portions broken away to illustrate the transverse openings provided therein. Fig. 6 is a top plan view of the base plate of my novel apparatus. Fig. 7 is a fragmentary sectional view on an enlarged scale of the base plate and mask support illustrating the cooperation of the various parts in retaining a rectifier plate within the recessed opening during the reducing and plating processes, Fig. 8 is a diagrammatic view of a circuit arrangement which may be used during the reducing and plating processes. Fig. 9 is a schematic view of the apparatus used during the reducing and plating processes, while Fig. 10 is a top plan view of an electrode carrier in which ballast resistors are nested within a compartment provided therein.

Similar reference characters refer to similar parts in each of the several views.

Referring to the drawings, the reference character A designates a fixture for holding a plurality of oxidized copper cells B (Fig. 7) while a surface of each of the cells is subjected to a reducing process in which the outer surface of the cuprous oxide coating is reduced to metallic copper, and to hold the rectifier cells while a contact member, preferably of nickel, is plated on the exposed metallic copper surface, as described in the aforesaid patent. As will hereinafter be more fully described, the fixture A is adapted to be connected to a pump C (Fig. 9) and the fixture set in a tank D containing an electrolytic solution.

The fixture A comprises a base plate 1, a mask support 2 having cemented or secured thereto in a suitable manner a mask or masking member 3, and an electrode carrier 4. Secured to said base plate are two upstanding guide rods 5 on which said mask support and said electrode carrier are slidably mounted. For purposes hereinafter appearing, the base plate 1 and the mask support 2 may be fastened together with the masking member 3 therebetween by four upwardly extending thumb screws 6 passing through openings 6a in said base plate and screwed into threaded openings 2a of the mask support. The lower ends of the thumb screws 6 serve as legs or supports for the fixture A.

The base plate 1 comprises two sections 1a and 1b made of a non-conducting material such as "Lucite" or "Bakelite," the upper section 1b being provided with two rows of recessed openings 1c. Disposed within each of the openings 1c is a flanged pin 7 biased in an upward direction by a small coil spring 8 disposed within each opening between the flanged end 7a (Fig. 7) of the pin and a conducting plate 9. The plates 9, the coil springs 8, and the flanged pins 7 serve as the cathode connection for the rectifier cells B as will hereinafter be apparent. The two sections 1a and 1b are secured or cemented together to form the unitary base plate.

The mask 3 is preferably made of rubber or a rubber compound and is provided with a plurality of openings 3a (Figs. 4 and 7) which are in alignment with the flanged pins 7 of the base plate when the base plate and mask support are clamped together. The openings 3a are formed with annular recesses which form shoulders 3b (Fig. 7) for purposes hereinafter appearing. Surrounding each of the openings 3a are integral dependent collars or gaskets 3c. Encircling the openings 3a of the masking member is a dependent rib or gasket 3d (Fig. 4). When the mask support 2 and the base plate 1 are screwed together by means of the thumb screws 6, the gaskets 3c of each of the openings 3a and the gasket 3d abut the upper surface of the base plate 1 to provide a fluid-tight seal for the openings 3a in the masking member so that no fluid may enter the openings between the base plate and the mask support.

The mask support 2 is made of non-conductive material like the base plate 1 and is provided with a plurality of openings 2b which are in axial alignment with the openings 3a of the mask 3. The upper ends of the mask support openings 2b are flared as at 2c to accommodate with some clearance the lower ends of the electrodes 10 secured to the electrode carrier 4.

The electrode carrier 4 is made of non-conductive material like the base plate 1 and the mask support 2, and like the base plate is made in two sections, a lower section 4a and an upper section 4b cemented together to form a unitary structure. The lower section 4a of the electrode carrier has secured therein the electrodes 10, the electrodes being in axial alignment with the openings 2b of the mask support. As illustrated in Fig. 3 the electrodes 10 abut a common conductive plate 11. It will be readily understood that each electrode may abut an individual conducting plate of the type provided for the pins 7 and the springs 8 of the base plate 1. The electrodes 10 are preferably made of an insoluble metal, such as stainless steel, and are covered except for the dependent pointed tips, by sheaths 10a of insulating material.

In using the fixture thus far described, the electrode carrier 4 may be first slipped off the ends of the guide rods 5. The fixture is then preferably inverted and the thumb screws 6 loosened so that the mask support and the base plate may be separated. An oxidized copper cell B is inserted in each of openings 3a of the mask 3 so that the one surface of the cell to be conditioned seats on the shoulder 3b of the opening. After the masking member has been loaded, the mask support 3 is then moved along the guide rods 5 so that the gaskets 3c and 3d of the masking member abut the base plate. The thumb screws 6 are then screwed to squeeze the mask support and base plate together. In so doing, the spring biased pins 7 will abut the rectifier cells B to hold the same against the shoulders 3b of the openings 3a in the masking member, thereby sealing the openings 3a against any entry of electrolytic fluid as will hereinafter appear. The electrode carrier 4 may then be slipped on over the guide rods 5 and positioned so that the tips of the electrodes 10 extend within the flared portions 2c of the openings 2a in the mask support as illustrated in Fig. 7. The fixture A may then be righted and set into the tank D containing the electrolytic solution.

As illustrated in Fig. 8 the conductive plate 11 is connected by a sheathed cable 12 (Figs. 1–3) to the plus terminal of a suitable supply voltage while the individual conductive plates 9 are connected through leads 13 encased in an insulating sheath 14 through ballast resistors R to the negative terminal of the supply voltage.

In Fig. 10 I have shown a modification of the electrode carrier. In this modification the electrode carrier 15 is provided with a recess or compartment 15a in which the ballast resistors R are secured. Each of the ballast resistors in this modification is connected through an individual contact plate 11 to an electrode 10, the resistors now being in the anode circuit instead of the cathode circuit as herein illustrated in Fig. 8.

The process as described in the aforementioned patent is then carried out for nickel plating a contact on the oxidized copper disc B. In carrying out the described processes, I prefer to use two tanks; one containing the dilute solution of ammonium hydroxide, the other containing the concentrated nickel plating solution. After the reducing step is completed, the fixture A may be lifted from the reducing tank, rinsed thoroughly in water and then set into the plating tank and the process completed.

Inherent in any of the prevalent nickel plating processes are the problems of maintaining the concentration of the solution constant, maintaining a constant pH value of the solution, and the formation and adherence of gas and air bubbles on the surface being plated. In the case of plating contacts on copper oxide rectifier cells having a diameter of approximately 0.08 inch, air bubbles in the solution adhering to the metallic copper surface of a rectifier cell prevent the plating of a contact on the rectifier cell surface.

I have found that the air bubbles in the plating solution can be eliminated by circulating the plating solution so that a smooth stream of solution is constantly passing over the surface to be plated. I have also found that circulating the plating solution insures a more constant pH content and maintains the concentration of the plating solution uniform. As a result, the contacts plated on the copper oxide rectifiers are bright and uniform.

To eliminate the air and gas bubbles adhering to the surface of the copper oxide rectifier cell and to provide a uniform flow of electrolytic solution over the surface, the mask support 2 is provided with a transverse opening or port 16 in each side thereof, said ports being shallow and extending toward the rows of openings 2b formed in said mask support (Fig. 5). A tubular insert 17 is secured within each of the ports 16, the ends of the inserts extending slightly beyond the edges of the mask support. The inner ends of the ports and inserts are drilled to form a series of divergent ports 18 which extend inwardly, each port terminating in an opening 2b of the mask support (Figs. 5 and 7). Fixed over the extending ends of the tubular inserts 17 are hoses 19 which are connected to the intake side of the pump C, the outlet side of the pump being connected to a hose 20 which returns the electrolytic solution to the tank D.

In operation, the pump C draws the electrolytic solution downwardly past the electrodes 10 into the flared openings 2b of the mask support, over the exposed surface of the copper oxide cell B and through the ports 18, the solution being returned to the tank D through the hose 20. Any bubbles which may adhere to the exposed surface of the rectifier cell or to the sides of the openings 2b are thus drawn off permitting fresh solution to pass over the rectifier surface.

It will be apparent from the foregoing description of my novel fixture for holding rectifier cells during an electrolytic process that the fixture is well adapted for use in plating electrical contacts on extremely small rectifier cells. It will be appreciated that a fixture of the character described may readily be used for holding small sized discs or large sized plates of various kinds during a plating process. The fluid-tight seals of the masking member gaskets when the mask support and base plate are clamped together prevent the leakage of electrolytic fluid behind the discs or plates acted upon, while the recessed openings of the masking member and the spring biased pins provide fluid-tight seals for the edges of the rectifier discs or plates which prevent electrolytic action from taking place where the oxide coating joins its mother copper along the edges of the cells. While the fixture herein described is advantageous in processing small discs in that individual handling of the discs during the process is eliminated, it will be patent that by structural changes of the various elements, plates of larger diameter and shapes other than circular may be accommodated by my fixture in carrying out an electrolytic process.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. A fixture for holding plates in an electrolytic bath comprising a mask of resilient material, said mask being provided with a plurality of openings, an annular shoulder in each of said openings for seating a plate disposed in the mask opening, a base plate, a member clamping said mask to said base plate to form a fluid-tight seal between said mask and said base plate, resilient contact means on said base plate for engaging the plates in said mask openings, said resilient contact means forcing the plates within the mask openings against their respective annular shoulders to form a fluid-tight seal therewith, said member having a plurality of openings coaxial with said mask openings, a port terminating in each of said member openings, means for connecting said port to a pump whereby the electrolytic fluid is moved through said ports and member openings over the exposed surfaces of the plates seated in the mask openings, electrodes received within said member openings with some clearance, and means for connecting said electrodes and said resilient contact means into an electrical circuit.

2. A fixture for holding plates in an electrolytic bath comprising, a mask of resilient material, said mask being provided with a plurality of openings, an annular shoulder in each of said openings for seating a plate disposed in said opening, a gasket for said mask, a base plate, resilient contact means on said base plate for engaging the plates in said mask openings, a member clamping said mask to said base so that said gasket forms a fluid-tight seal, said resilient contact means forcing the plates within the mask openings against their respective shoulders to form fluid-tight seals therewith, said member having a plurality of openings coaxial with said mask openings and provided with a plurality of ports terminating in said openings, means for connecting said ports to a pump whereby the electrolytic fluid is moved through said ports and member openings over the exposed surfaces of the plates seated in the mask openings, electrodes received within said member openings with some clearance, and means for connecting said electrodes and said resilient contact means into an electrical circuit.

3. A fixture for holding plates in an electrolytic bath comprising, a mask of resilient material, said mask being provided with a plurality of openings, an annular shoulder in each of said openings for seating a plate disposed in said opening, a gasket for each of said openings, a base plate, resilient contact means on said base plate for engaging the plates in said mask openings, a member clamping said mask to said base so that said gaskets engage said base plate in a fluid-tight manner, said resilient contact means forcing the plates within the mask openings against their respective shoulders to form fluid-tight seals therewith, said member having a plurality of openings coaxial with said mask openings and provided with a plurality of ports terminating in said openings, means for connecting said ports to a pump whereby the electrolytic fluid is moved through said ports and member openings over the exposed surfaces of the plates seated in the mask openings, electrodes received within said member openings with some clearance, and means for connecting said electrodes and said resilient contact means into an electrical circuit.

4. A fixture for holding plates in an electrolytic bath comprising, a mask of resilient material, said mask being provided with a plurality of openings, an annular shoulder in each of said openings for seating a plate disposed in said opening, a gasket for each of said openings, a gasket for said mask, a base plate, resilient contact means on said base plate for engaging the plates in said mask openings, a member clamping said mask to said base so that said gaskets engage said base plate in a fluid-tight manner, said resilient contact means forcing the plates within the mask openings against their respective shoulders to form fluid-tight seals therewith, said member having a plurality of openings coaxial with said mask openings and provided with a plurality of ports terminating in said openings, means for connecting said ports to a pump whereby the electrolytic fluid is moved through said ports and member openings over the exposed surfaces of the plates seated in the mask openings, electrodes received within said member openings with some clearance, and means for connecting said electrodes and said resilient contact means into an electrical circuit.

5. A fixture for holding plates in an electrolytic bath comprising, a mask of resilient material, said mask being provided with a plurality of openings, an annular shoulder in each of said openings for seating a plate disposed in said opening, a gasket integral with said mask for each of said openings and encompassing their respective openings, a protruding rib integral with said mask and encircling said opening gaskets, a base plate, resilient contact means on said base plate for engaging the plates in said mask openings, a member clamping said mask to said base so that said gaskets and said rib engage said base plate in a fluid-tight manner, said resilient contact means forcing the plates within the mask openings against their respective shoulders to form fluid-tight seals therewith, said member having a plurality of openings coaxial with said mask openings and provided with a plurality of ports terminating in said openings, means for connecting said ports to a pump whereby the electrolytic fluid is moved through said ports and member openings over the exposed surfaces of the plates seated in the mask openings, electrodes received within said member openings with some clearance, and means for connecting said electrodes and said resilient contact means into an electrical circuit.

6. A fixture for holding rectifier cells in an electrolytic bath comprising, a base plate, guide rods secured to said base plate, a plurality of pins recessed in said base plate, biasing means for said pins, a mask support slidably received on said guide rods, a mask of resilient material secured to said mask support, said mask support and said mask being provided with openings aligned with said pins, an annular shoulder in each of said mask openings for seating a rectifier cell disposed in the mask opening, a gasket integral with said mask for reach of said openings and encompassing their respective openings, a protruding rib integral with said mask and encircling said mask opening gaskets, means for clamping said base plate and said mask support together so that said mask gaskets and rib form fluid-tight seals with said base plate, said biased pins engaging the rectifier cells in the mask openings to force said cells against their respective shoulders to form fluid-tight seals therewith, an electrode carrier slidably mounted on said guide rods, a plurality of electrodes secured to said carrier in axial alignment with the mask support openings and receivable therein with some clearance, and means for connecting said electrodes and said pins in an electrical circuit.

7. A fixture for holding rectifier cells in an electrolytic bath comprising, a base plate, guide rods secured to said base plate, a plurality of pins recessed in said base plate, biasing means for said pins, a mask support slidably received on said guide rods, a mask of resilient material secured to said mask support, said mask support and said mask being provided with openings aligned with said pins, an annular shoulder in each of said mask openings for seating a rectifier cell disposed in the mask opening, a gasket integral with said mask for each of said openings and encompassing their respective openings, a protruding rib integral with said mask and encircling said mask opening gaskets, means for clamping said base plate and said mask support together so that said mask gaskets and rib form fluid-tight seals with said base plate, said biased pins engaging the rectifier cells in the mask openings to force said cells against their respective shoulders to form fluid-tight seals therewith, transverse ports in said mask support terminating in said mask support openings, means for connecting said ports to a pump whereby the electrolytic fluid is moved through said ports and said mask support openings over the exposed surfaces of the rectifier cells seated in said mask openings, an electrode carrier slidably mounted on said guide rods, a plurality of electrodes secured to said carrier in axial alignment with the mask support openings and receivable therein with some clearance, and means for connecting said electrodes and said pins in an electrical circuit.

8. A fixture for holding rectifier cells in an electrolytic bath comprisng, a base plate, guide rods secured to said base plate, a plurality of recesses in said base plate, a pin within each of said recesses, a contact plate in each recess, a spring disposed within each of said recesses and interposed between the pin and plate in each recess to bias their respective pins to protruding positions, as mask support slidably received on said guide rods, a mask of resilient material secured to said mask support, said mask support and said mask being provided with openings aligned with said pins, an annular shoulder in each of said mask openings for seating a rectifier cell disposed in the mask opening, a gasket integral with said mask for each of said openings and encompassing their respective openings, a protruding rib integral with said mask and encircling said mask opening gaskets, means for clamping said base plate and said mask support together so that said mask gaskets and rib form fluid-tight seals with said base plate, said spring biased pins engaging the rectifier cells in the mask openings to force said cells against their respective shoulders to form fluid-tight seals therewith, an electrode carrier slidably mounted on said guide rods, a plurality of electrodes secured to said carrier in axial alignment with the mask support openings and receivable therein with some clearance, and means for connecting said electrodes, said contact plates, spring and pins in an electrical circuit.

9. A fixture for holding rectifier cells in an electrolytic bath comprising, a base plate, guide rods secured to said base plate, a plurality of recesses in said base plate, a pin within each of said recesses, a contact plate in each recess, a spring disposed within each of said recesses and interposed between the pin and plate in each recess to bias their respective pins to protruding positions, a mask support slidably received on said guide rods, a mask of resilient material secured to said mask support, said mask support and said mask being provided with openings aligned with said pins, an annular shoulder in each of said mask openings for seating a rectifier cell disposed in the mask opening, a gasket integral with said mask for each of said openings and encompassing their respective openings, means for clamping said base plate and said mask support together so that said mask gaskets form fluid-tight seals with said base plate, said spring biased pins engaging the rectifier cells in the mask openings to force said cells against their respective shoulders to form fluid-tight seals therewith, said mask support being formed with transverse ports terminating in said mask support openings, means for connecting said ports to a pump whereby the electrolytic fluid is moved through said ports and said mask support openings over the exposed surfaces of the rectifier cells seated in said mask openings, an electrode carrier slidably mounted on said guide rods, a plurality of electrodes secured to said carrier in axial alignment with the mask support openings and receivable therein with some clearance, and means for connecting said electrodes, said contact plates, springs and pins in an electrical circuit.

10. A fixture for holding rectifier cells in an electrolytic bath comprising, a base plate, guide rods secured to said base plate, a plurality of recesses in said base plate, a pin within each of said recesses, a contact plate in each recess, a spring disposed within each of said recesses and interposed between the pin and plate in each recess to bias their respective pins to protruding positions, a mask support slidably received on said guide rods, a mask of resilient material secured to said mask support, said mask support and said mask being provided with openings aligned with said pins, an annular shoulder in each of said mask openings for seating a rectifier cell disposed in the mask opening, a gasket integral with said mask and encircling said mask openings, means for clamping said base plate and said mask support together so that said mask gasket forms a fluid-tight seal with said base plate, said spring biased pins engaging the rectifier cells in the mask openings to force said cells against their respective shoulders to form fluid-tight seals therewith, said mask support being formed with transverse ports terminating in said mask support openings, means for connecting said ports to a pump whereby the electrolytic fluid is moved through said ports and said mask support openings over the exposed surfaces of the rectifier cells seated in said mask openings, an electrode carrier slidably mounted on said guide rods, a plurality of electrodes secured to said carrier in axial alignment with the mask support openings and receivable therein with some clearance, and means for connecting said electrodes, said contact plates, springs and pins in an electrical circuit.

11. A fixture for holding rectifier cells in an electrolytic bath comprising, a base plate, guide rods secured to said base plate, a plurality of recesses in said base plate, a pin within each of said recesses, a contact plate in each recess, a spring disposed within each of said recesses and interposed between the pin and plate in each recess to bias their respective pins to protruding positions, a mask support slidably received on said guide rods, a mask of resilient material secured to said mask support, said mask support and said mask being provided with openings aligned with said pins, an annular shoulder in each of said mask openings for seating a rectifier cell disposed in the mask opening, a gasket integral with said mask for each of said openings and encompassing their respective openings, a protruding rib integral with said mask and encircling said mask opening gaskets, means for clamping said base plate and said mask support together so that said mask gaskets and rib form fluid-tight seals with said base plate; said spring biased pins engaging the rectifier cells in the mask openings to force said cells against their respective shoulders to form fluid-tight seals therewith, said mask support being formed with transverse ports terminating in said mask support openings, means for connecting said ports to a pump whereby the electrolytic fluid is moved through said ports and said mask support openings over the exposed surfaces of the rectifier cells seated in said mask openings, an electrode carrier slidably mounted on said guide rods, a plurality of electrodes secured to said carrier in axial alignment with the mask support openings and receivable therein with some clearance, and means for connecting said electrodes, said contact plates, springs and pins in an electrical circuit.

12. A fixture for holding rectifier cells in an electrolytic bath comprising, a base plate, guide rods secured to said base plate, a plurality of recesses in said base plate, a pin within each of said recesses, a contact plate in each recess, a spring disposed within each of said recesses and interposed between the pin and plate in each recess to bias their respective pins to protruding positions, a mask support slidably received on said guide rods, a mask of resilient material secured to said mask support, said mask support and said mask being provided with openings aligned with said pins, an annular shoulder in each of said mask openings for seating a rectifier cell disposed in the mask opening, a gasket integral with said mask for each of said openings and encompassing their respective openings, a protruding rib integral with said mask and encircling said mask opening gaskets, means for clamping said base plate and said mask support together so that said mask gaskets and rib form fluid-tight seals with said base plates; said spring biased pins engaging the rectifier cells in the mask openings to force said cells against their respective shoulders to form fluid-tight seals therewith, said mask support being formed with transverse ports terminating in said mask support openings, means for connecting said ports to an exhaust pump whereby the electrolytic fluid is moved through said ports and said mask support openings over the exposed surfaces of the rectifier cells seated in said mask openings, an electrode carrier slidably mounted on said guide rods, a plurality of electrodes secured to said carrier in axial alignment with the mask support openings and receivable therein with some clearance, a compartment in said electrode carrier, ballast resistors nested in said compartment, and means for connecting said electrodes, said contact plates, springs and pins and said ballast resistors in an electrical circuit.

References Cited in the file of this patent

UNITED STATES PATENTS

| | | |
|---|---|---|
| 1,808,809 | Ewing | June 9, 1931 |
| 2,073,679 | Brown | Mar. 16, 1937 |
| 2,389,904 | Hampson | Nov. 27, 1945 |
| 2,401,415 | Duggan | June 4, 1946 |
| 2,532,907 | Hangosky | Dec. 5, 1950 |